(12) United States Patent
Iga et al.

(10) Patent No.: US 10,954,671 B2
(45) Date of Patent: Mar. 23, 2021

(54) VIBRATION ISOLATION SUPPORTING STRUCTURE AND VIBRATION ISOLATION SYSTEM

(71) Applicant: Hitachi-GE Nuclear Energy, Ltd., Ibaraki (JP)

(72) Inventors: Yoshihiko Iga, Tokyo (JP); Hirokuni Ishigaki, Tokyo (JP)

(73) Assignee: HITACHI-GE NUCLEAR ENERGY, LTD., Ibaraki (JP)

( * ) Notice: Subject to any disclaimer, the term of this patent is extended or adjusted under 35 U.S.C. 154(b) by 0 days.

(21) Appl. No.: 16/633,329

(22) PCT Filed: Jul. 5, 2018

(86) PCT No.: PCT/JP2018/025462
§ 371 (c)(1),
(2) Date: Jan. 23, 2020

(87) PCT Pub. No.: WO2019/026520
PCT Pub. Date: Feb. 7, 2019

(65) Prior Publication Data
US 2020/0157801 A1    May 21, 2020

(30) Foreign Application Priority Data
Aug. 2, 2017  (JP) .............................. JP2017-149608

(51) Int. Cl.
*E04B 1/98*       (2006.01)
*E04F 15/18*     (2006.01)
(Continued)

(52) U.S. Cl.
CPC ................ *E04B 1/98* (2013.01); *E04F 15/18* (2013.01); *E04H 9/021* (2013.01); *F16F 15/02* (2013.01);
(Continued)

(58) Field of Classification Search
CPC ..... E04F 15/22; E04F 15/18; E04F 15/02447; E04F 15/02044; E04F 15/02452;
(Continued)

(56) References Cited

U.S. PATENT DOCUMENTS 4,565,039 A * 1/1986 Oguro ..................... E02D 27/34
                                                                248/567
4,599,834 A * 7/1986 Fujimoto ................ E02D 27/34
                                                                376/285
(Continued)

FOREIGN PATENT DOCUMENTS

JP       58-189455 A      11/1983
JP       02-163536 A       6/1990
(Continued)

OTHER PUBLICATIONS

International Search Report of PCT/JP2018/025462 dated Oct. 16, 2018.

*Primary Examiner* — Chi Q Nguyen
(74) *Attorney, Agent, or Firm* — Mattingly & Malur, PC

(57) ABSTRACT

A vibration isolation supporting structure and a vibration isolation system that can prevent a high-frequency vibration and a low-frequency vibration generated on a floor of a building. The vibration isolation supporting structure includes a plurality of supporting portions erected facing each other in a predetermined area near a wall of a floor of a building, a supporting structure supported on the floor by the supporting portions, and a fixing device configured to fix the supporting structure to the floor, and when receiving a release command, the fixing device releases fixing of the supporting structure to the floor.

6 Claims, 8 Drawing Sheets

(51) Int. Cl.
*E04H 9/02* (2006.01)
*F16F 15/02* (2006.01)

(52) U.S. Cl.
CPC ... *F16F 2230/0029* (2013.01); *F16F 2234/02* (2013.01)

(58) Field of Classification Search
CPC .. E04F 2015/02055; E04H 9/021; E04B 1/98; F16F 15/02; E02D 27/34
USPC .......... 52/167.4, 167.8, 167.5, 167.2, 167.7, 52/167.1; 248/636
See application file for complete search history.

(56) References Cited

U.S. PATENT DOCUMENTS

| | | | |
|---|---|---|---|
| 4,805,359 A | 2/1989 | Miyake et al. | |
| 5,000,415 A * | 3/1991 | Sandercock | F16F 15/02 248/550 |
| 6,648,295 B2 * | 11/2003 | Herren | F16F 15/0275 248/562 |
| 7,726,452 B2 * | 6/2010 | Kraner | F16F 7/1017 188/378 |
| 8,429,862 B2 * | 4/2013 | Yin | E04H 9/0215 52/167.4 |
| 9,574,364 B2 * | 2/2017 | Katayama | E04H 9/022 |
| 2006/0179729 A1 * | 8/2006 | Li | E04H 9/02 52/167.7 |
| 2007/0151173 A1 * | 7/2007 | Paugh | E02D 27/34 52/169.9 |
| 2007/0261323 A1 * | 11/2007 | Hubbard | E04B 1/98 52/167.6 |
| 2015/0315805 A1 * | 11/2015 | Stenswick | E04B 1/36 52/167.4 |
| 2015/0361656 A1 * | 12/2015 | Miyazaki | B22D 19/16 52/167.8 |
| 2016/0115703 A1 * | 4/2016 | Katayama | E04H 9/022 52/167.8 |
| 2016/0122498 A1 * | 5/2016 | Wake | C08L 93/04 52/167.1 |
| 2016/0138263 A1 * | 5/2016 | Koyama | E04B 1/98 52/167.1 |
| 2017/0337799 A1 | 11/2017 | Ono et al. | |

FOREIGN PATENT DOCUMENTS

| | | |
|---|---|---|
| JP | 2010-047953 A | 3/2010 |
| JP | 2014-152592 A | 8/2014 |
| JP | 2016-094750 A | 5/2016 |

* cited by examiner

[FIG. 1]
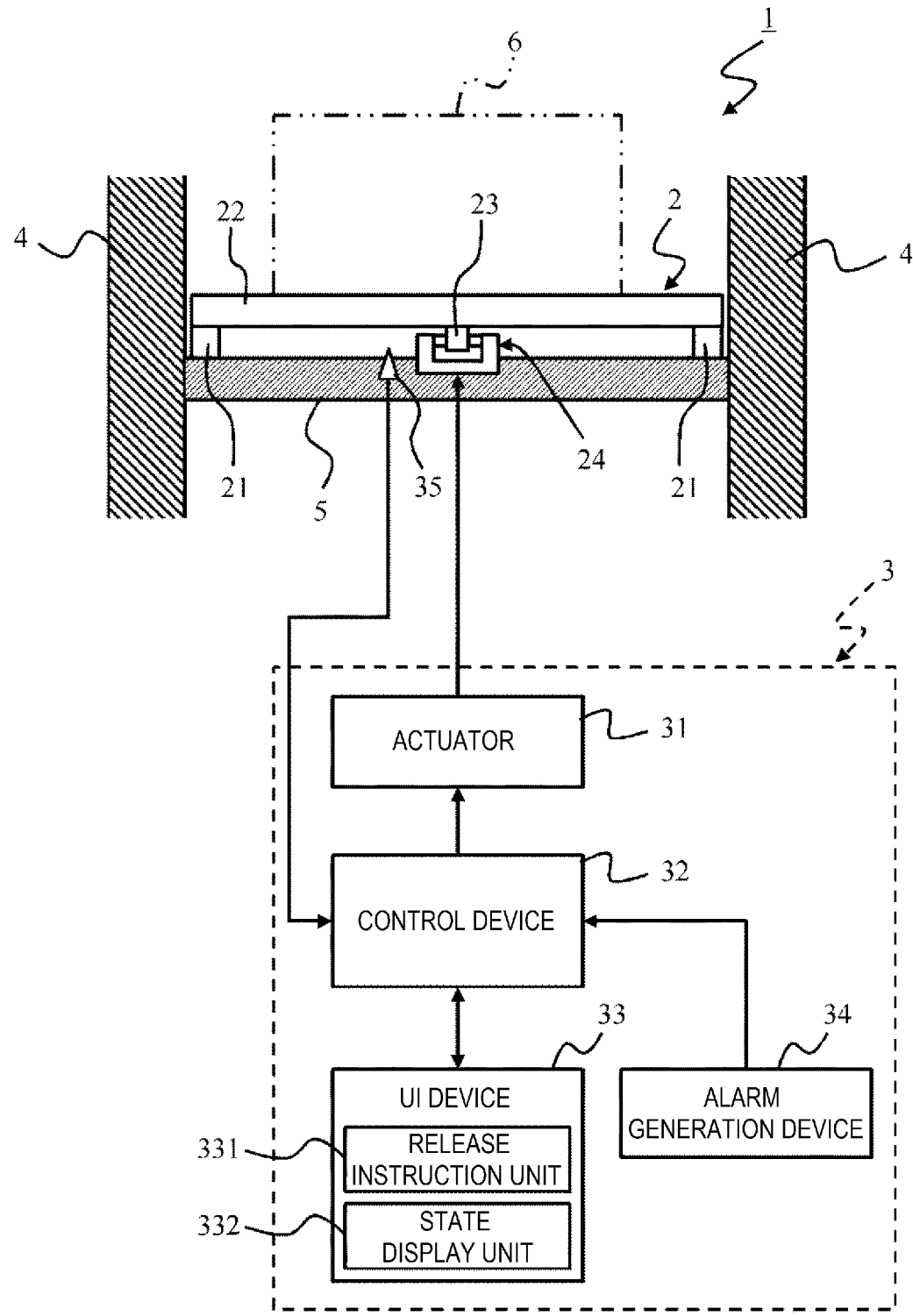

[FIG. 2]
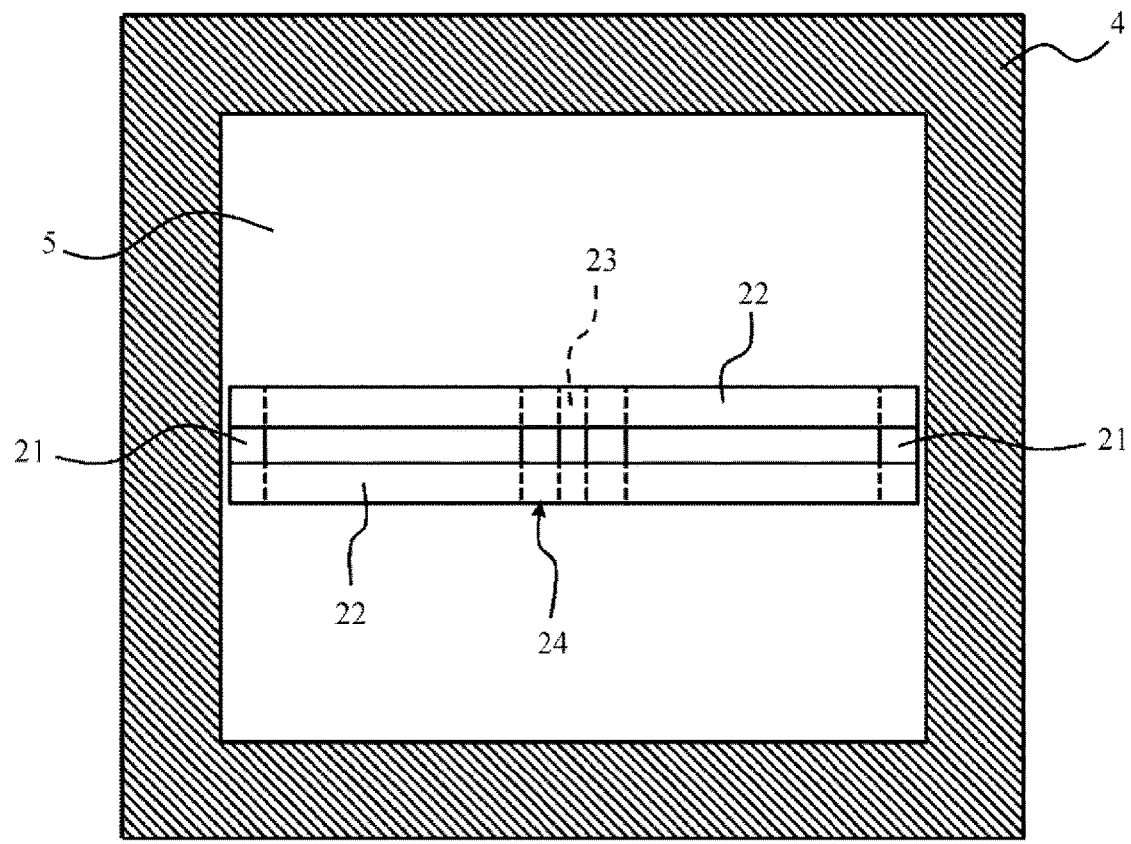
[FIG. 3]
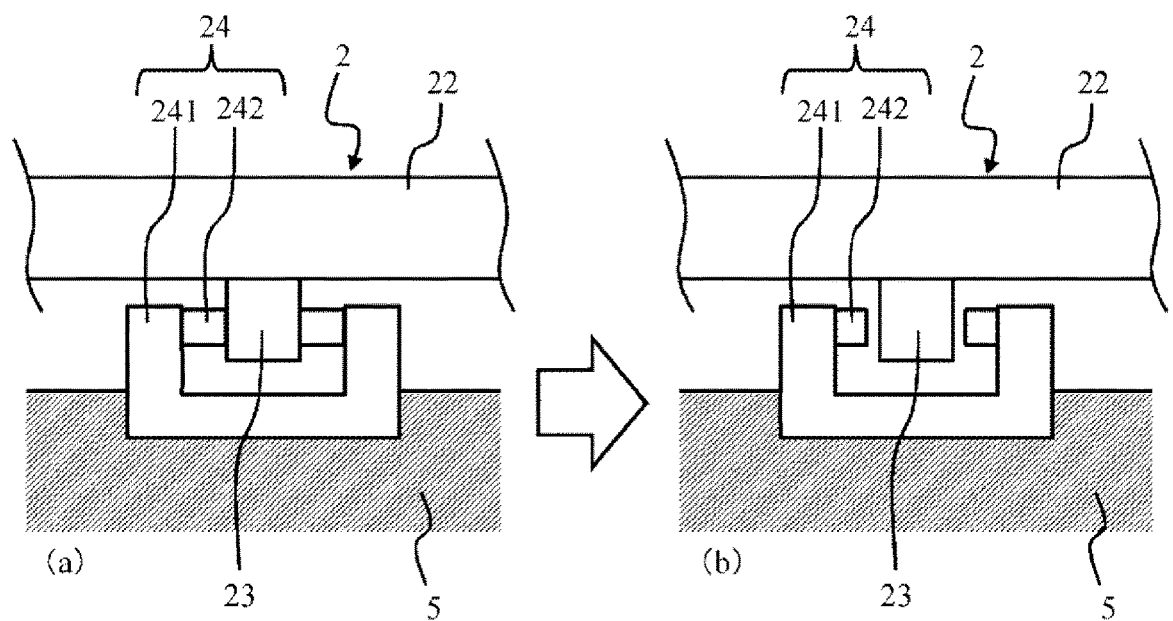

[FIG. 4]
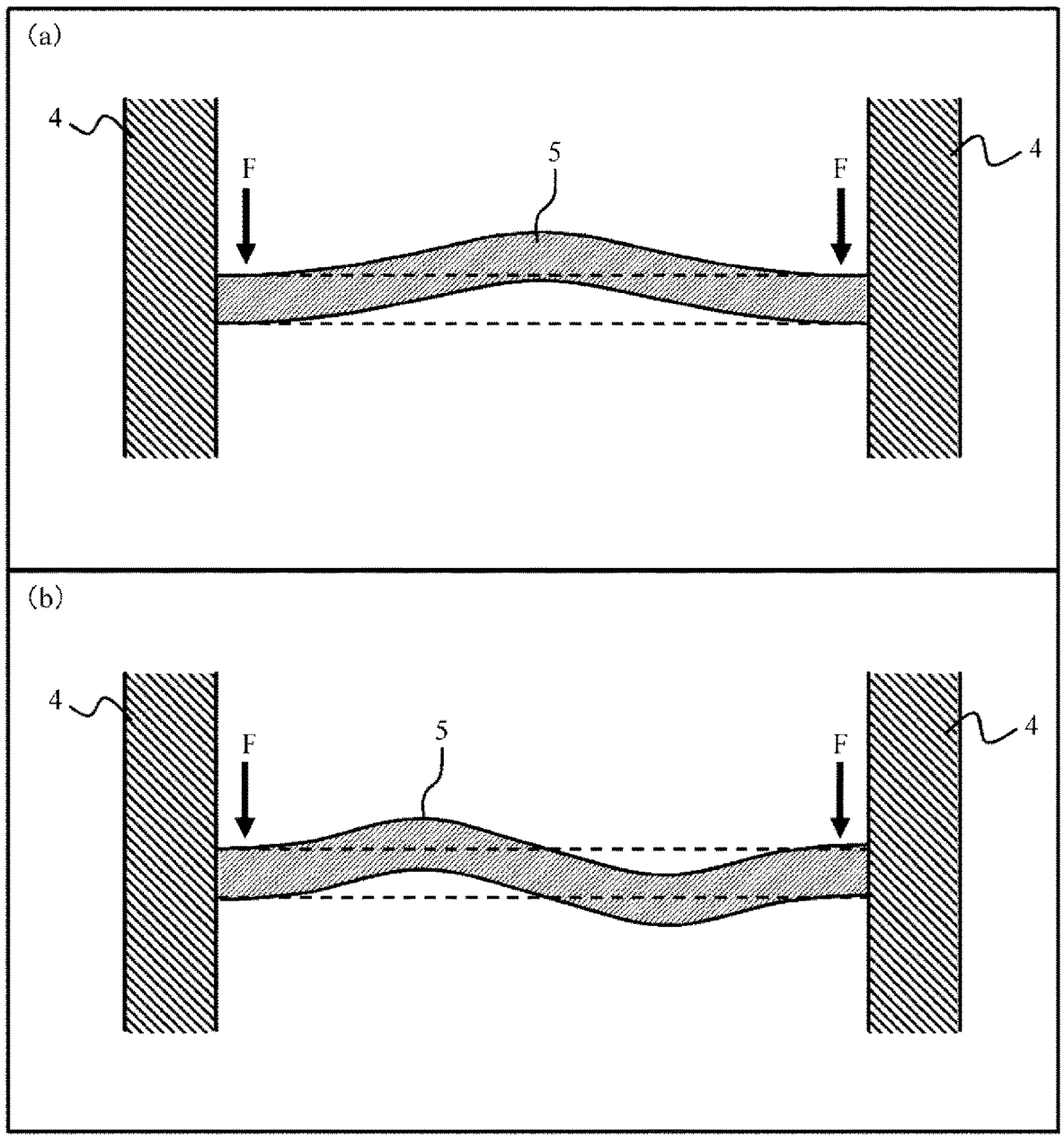

[FIG. 5]
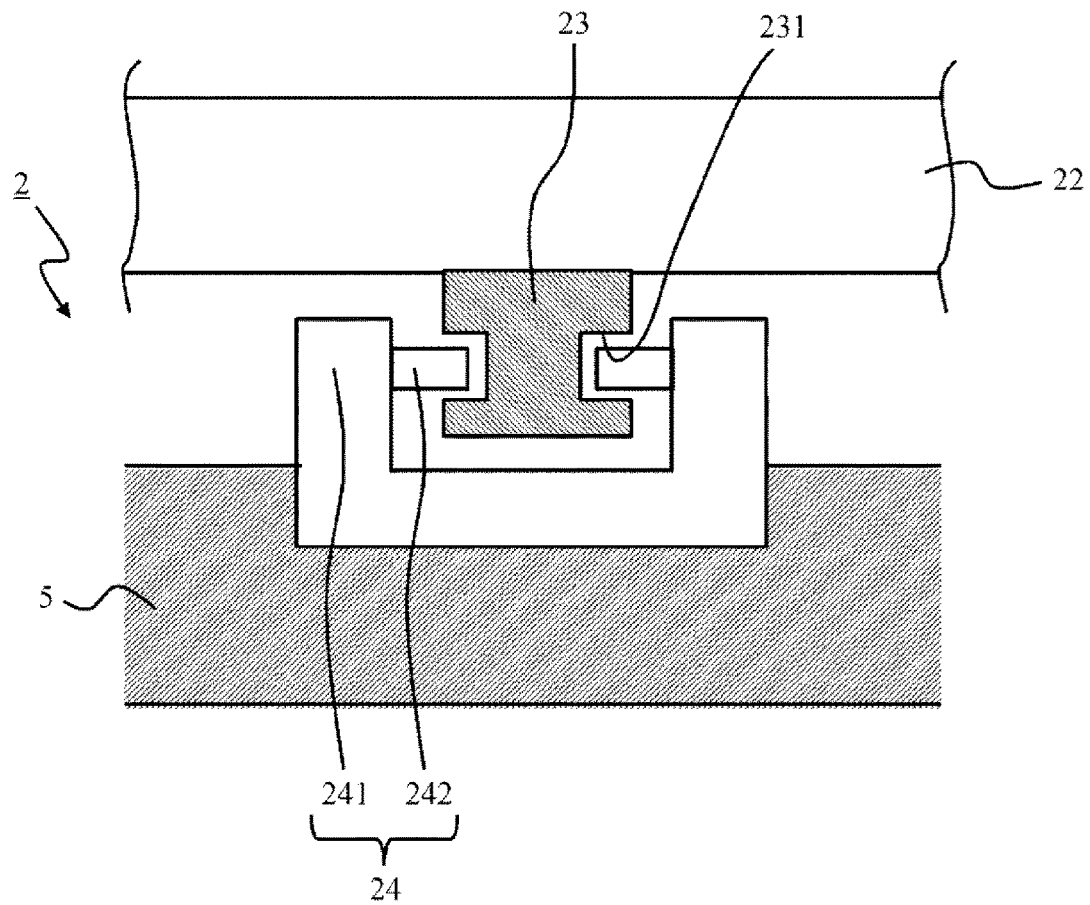
[FIG. 6]
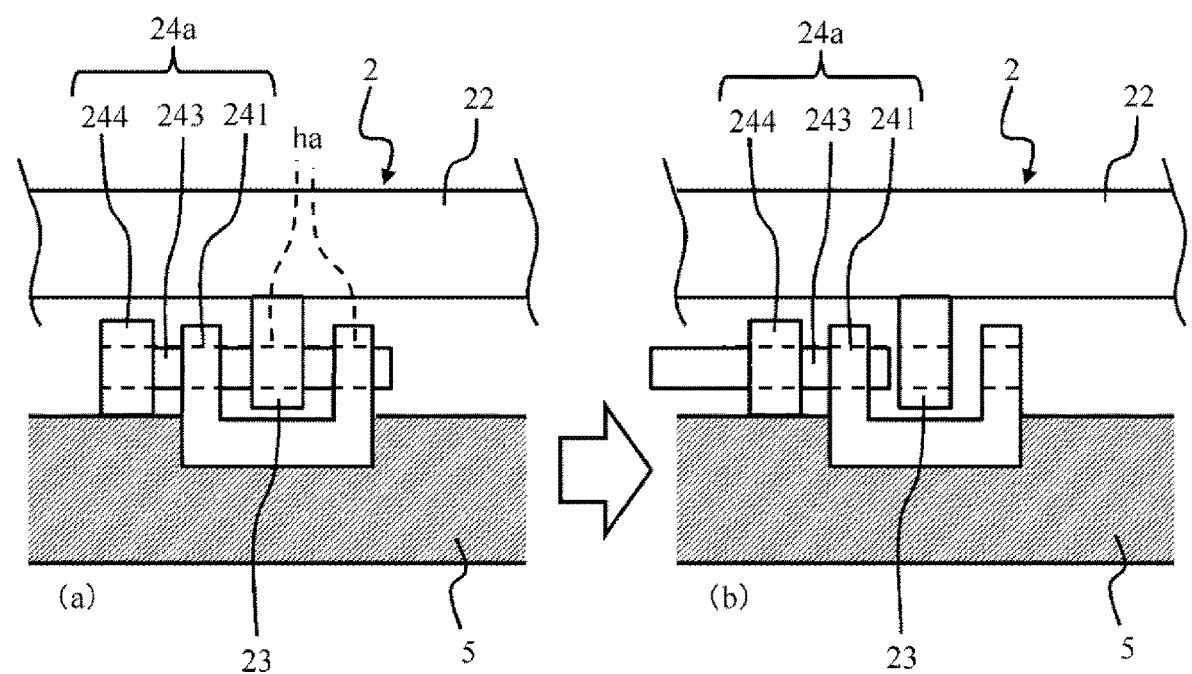

[FIG. 7]
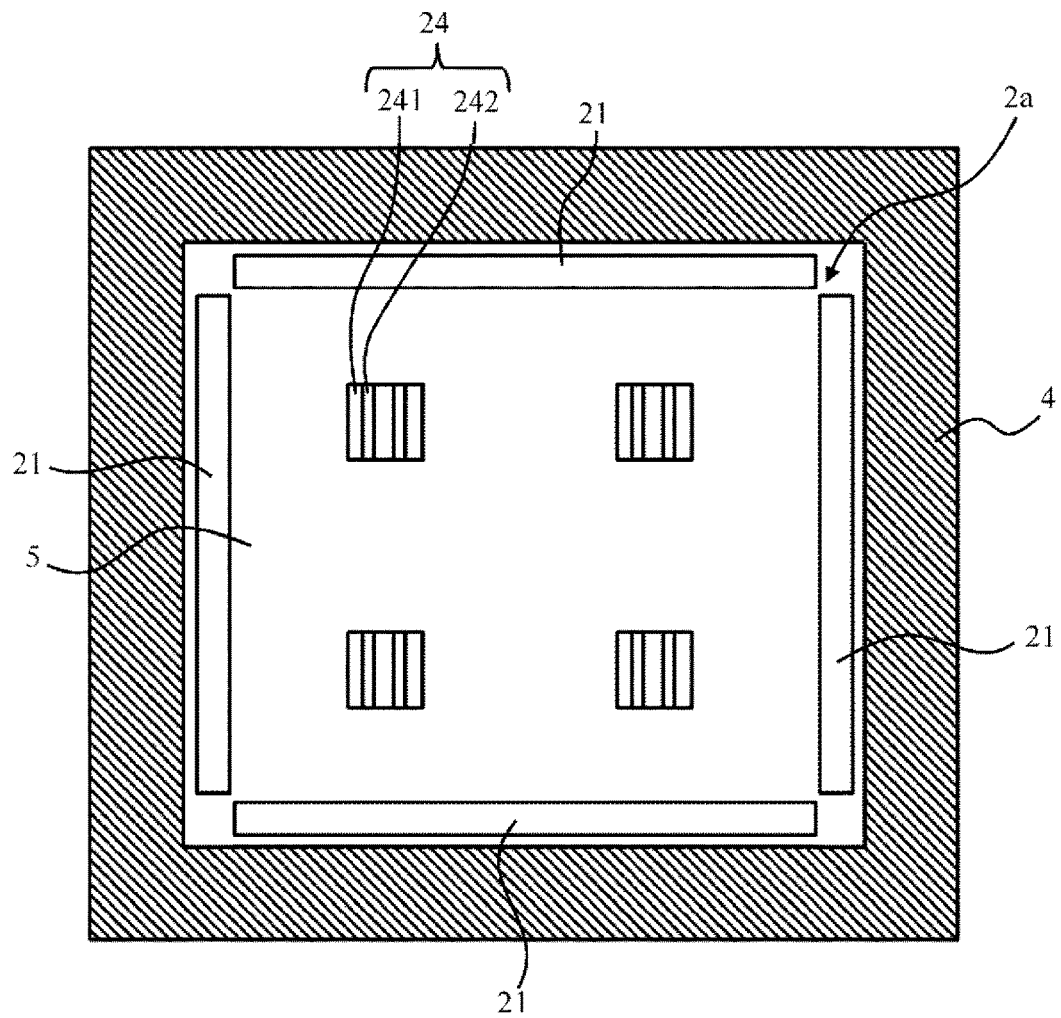
[FIG. 8]
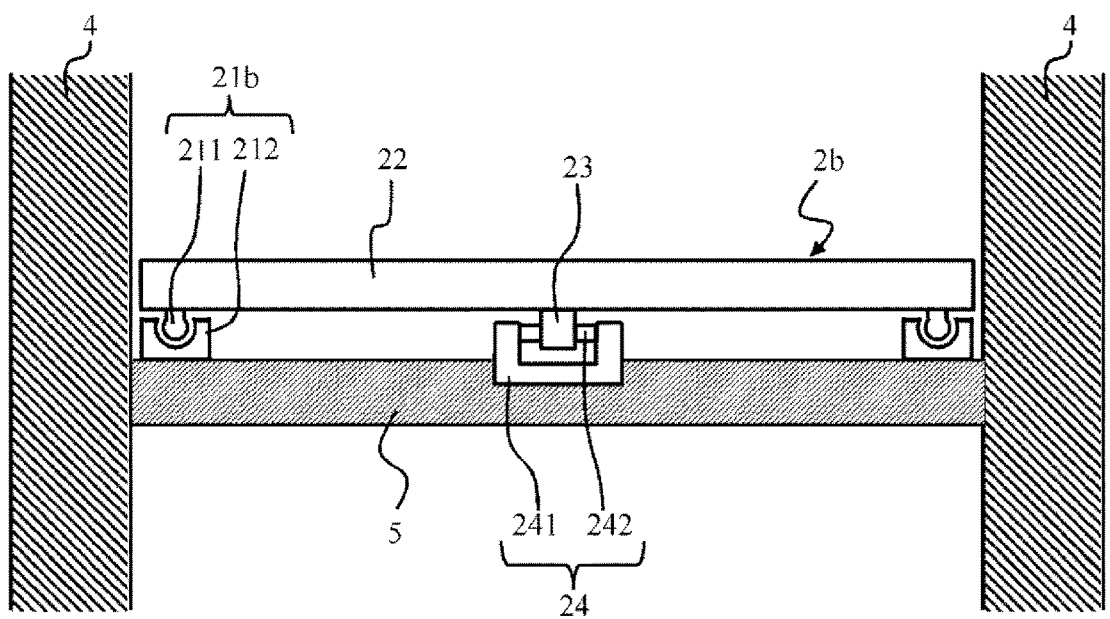

[FIG. 9]
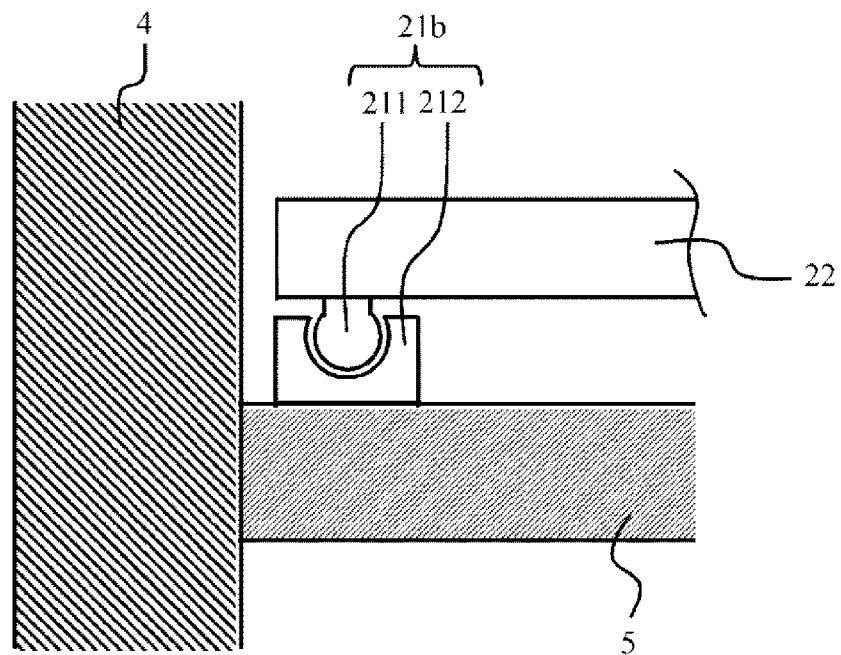
[FIG. 10]
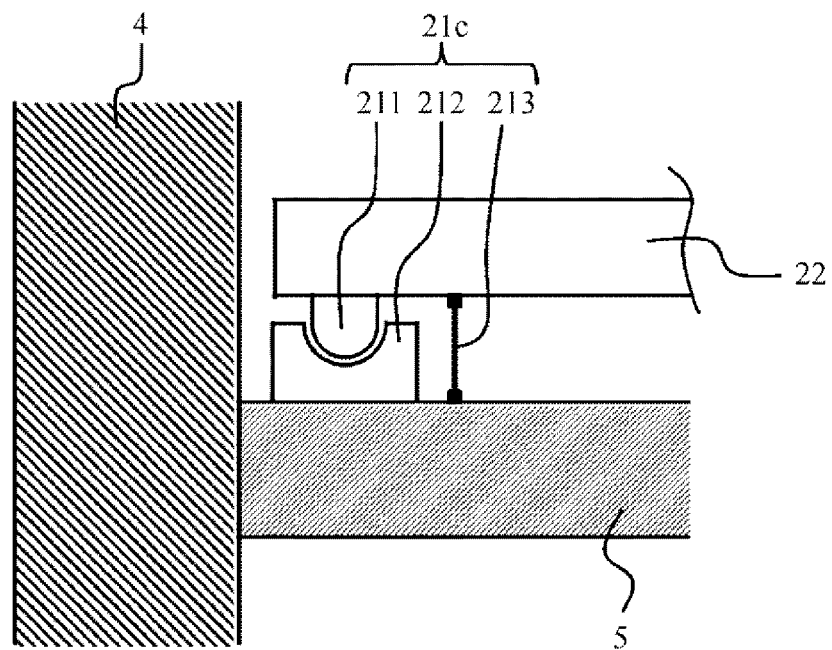

[FIG. 11]
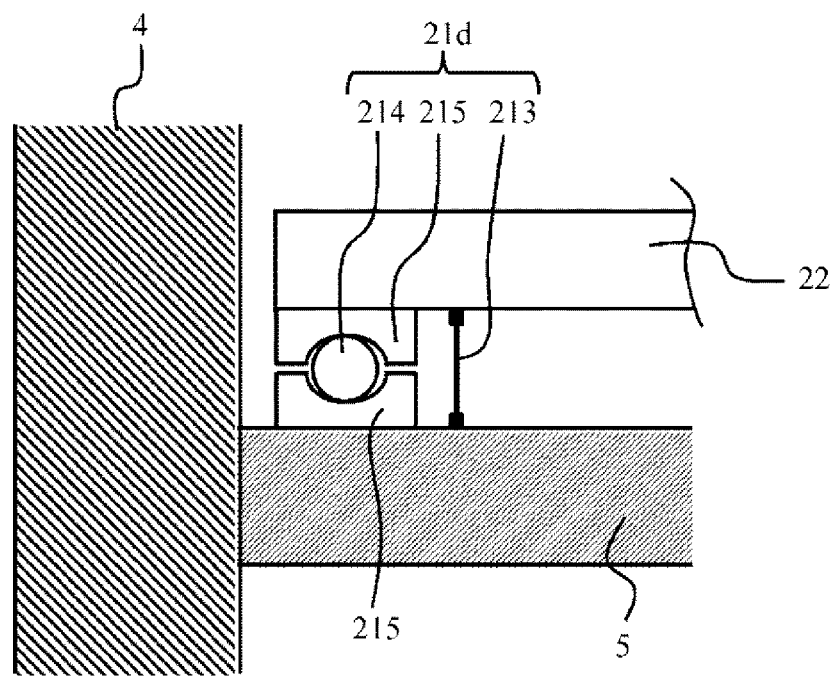
[FIG. 12]
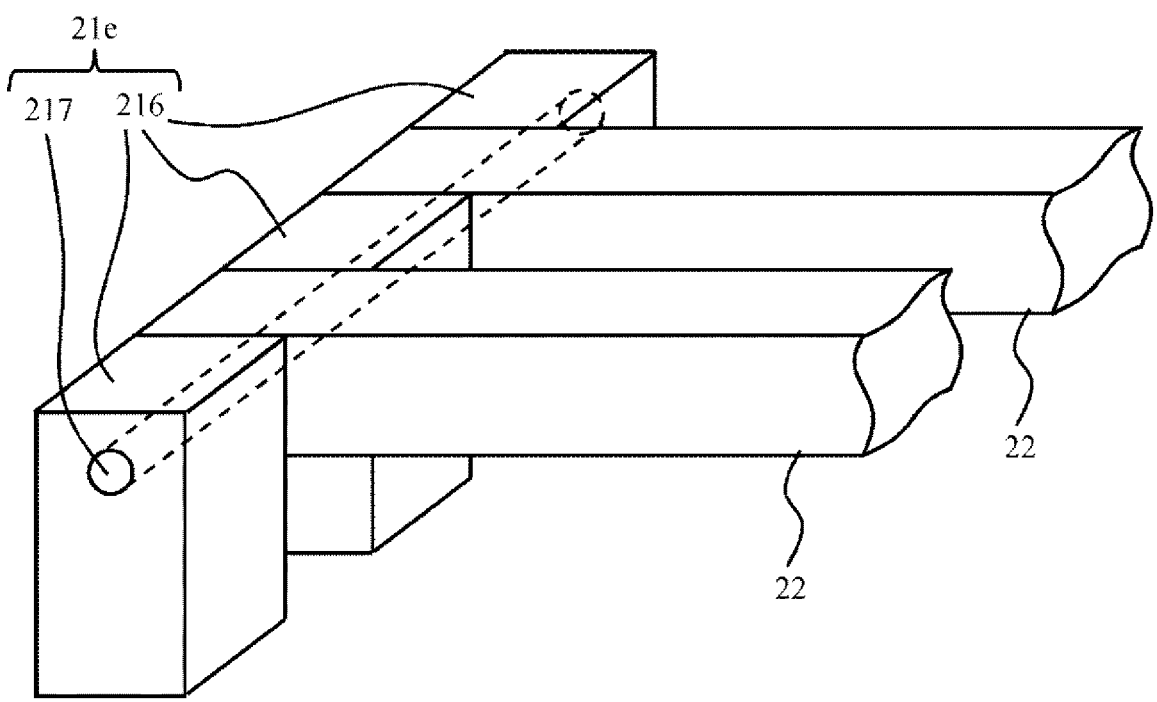

[FIG. 13]
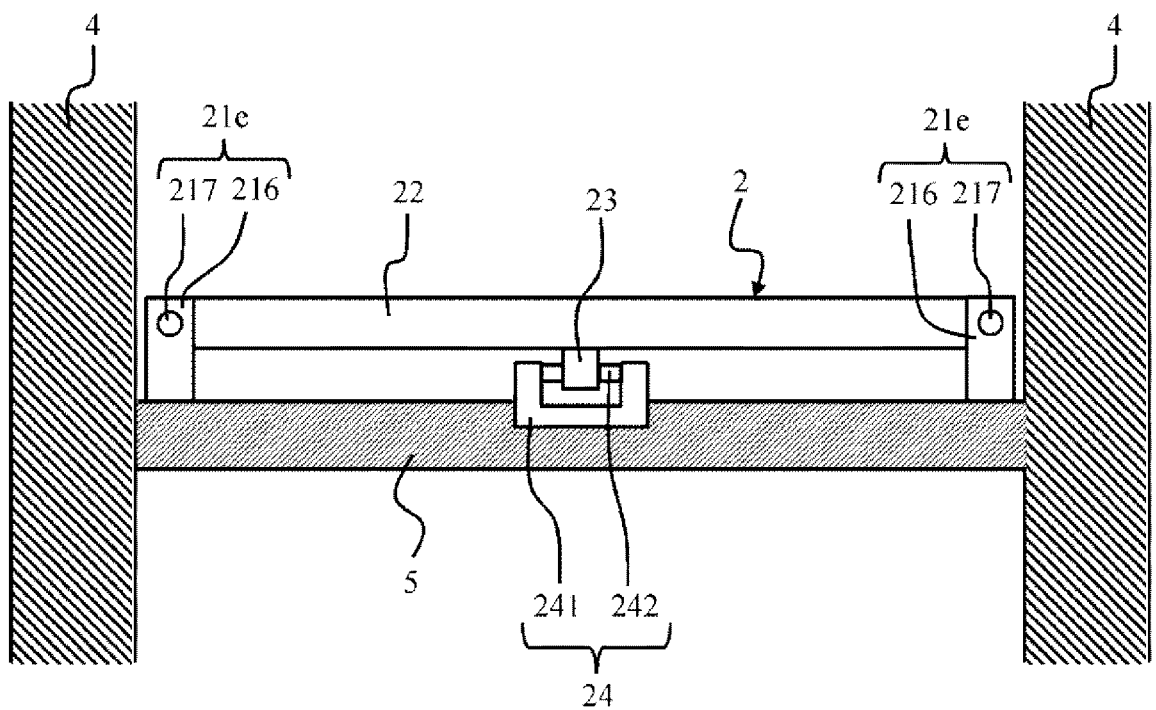

VIBRATION ISOLATION SUPPORTING STRUCTURE AND VIBRATION ISOLATION SYSTEM

TECHNICAL FIELD

The present invention relates to a vibration isolation supporting structure and a vibration isolation system.

BACKGROUND ART

A nuclear reactor building that houses a nuclear containment vessel or the like is firmly constructed using reinforced concrete or the like such that the nuclear reactor building can withstand natural disasters such as an earthquake. In recent years, there is also a demand for further enhancement of safety against an aircraft collision or the like.

When a flying object such as an aircraft collides with the nuclear reactor building, vibration generated by the collision propagates through a floor from a roof or a wall, and vibrates equipment placed on the floor in the building. The vibration includes a high-frequency component and may generate a large acceleration in the equipment. Therefore, it is necessary to prevent the vibration of the equipment placed on the floor so that the acceleration of the equipment is an allowable level or less.

In the related art, as a structure for reducing the vibration of the floor, a vibration isolation floor structure that can quickly attenuate the vibration of the floor is proposed (PTL 1). In this technique in the related art, between a floor beam and a structural frame that supports an end of the floor beam, a supporting member that transmits a load of the floor beam to the structural frame and a viscoelastic member that prevents a rotational displacement of the end of the floor beam generated by a vibration of the floor beam are disposed. The supporting member includes a rod-shaped member (reinforcement or circular steel pipe) having a circular cross section, a spherical member (steel ball), or the like, and is disposed along a direction perpendicular to a material axis of the floor beam. The viscoelastic member is formed of a silicone or polyurethane resin, and is disposed on both sides of the supporting member. In the structure of the related art, the rotational displacement of the end of the floor beam generated by the vibration of the floor beam is prevented by the viscoelastic member, so that the vibration of the floor can be attenuated quickly.

A technique for preventing a high-order vibration when the aircraft collides with a nuclear power plant is also known (PTL 2). In the technique of PTL 2, a spherical impactor having a large mass is fixed so as not to move normally, and the impactor can be moved during an aircraft collision. Then, a vibration energy is attenuated by moving the impactor with an impact generated during the aircraft collision.

CITATION LIST

Patent Literature

PTL 1: JP-A-2010-47953
PTL 2: JP-A-2014-152592

SUMMARY OF INVENTION

Technical Problem

In the technique of the related art described in PTL 1, since a displacement of the floor in a horizontal direction is softly restrained by the viscoelastic member, the floor is in a state of being seismically isolated in the horizontal direction. In seismic isolation, high-frequency vibration transmission from the structural frame to the equipment on the floor can be blocked. However, if floor-placing equipment such as a pump is placed on the floor under seismic isolation, when the entire building vibrates at a low frequency during an earthquake, a relative displacement may occur between the building and the pump, and a large stress may be generated in a pipe connected to the pump.

In the technique of the related art described in PTL 2, since the vibration energy is absorbed by the movement of the heavy impactor, the structure is large and cost is also high.

In the related art, a high-frequency vibration and a low-frequency vibration cannot be prevented by one common structure. Thus, to cope with both vibrations, a separate vibration isolation structure is needed, which is not easy to use and increases cost.

The invention has been made in view of the above problems, and an object of the invention is to provide a vibration isolation supporting structure and a vibration isolation system that can prevent a high-frequency vibration and a low-frequency vibration generated on a floor of a building.

Solution to Problem

In order to solve the above problems, a vibration isolation supporting structure according to the invention prevents the low-frequency and high-frequency vibration, the vibration isolation supporting structure including: a plurality of supporting portions erected facing each other in a predetermined area near a wall of a floor of a building; a supporting structure supported above the floor by the supporting portions; and a fixing device configured to fix the supporting structure to the floor, and when receiving a release command, the fixing device releases fixing of the supporting structure to the floor.

Advantageous Effect

According to the invention, since the supporting structure is supported on the floor by the supporting portions and the fixing device, the supporting structure is displaced together with the building against a low-frequency vibration that deforms the entire building, and a relative displacement between the supporting structure and the building can be prevented. When the fixing device receives the release command and releases the fixing of the supporting structure to the floor, the supporting structure is supported by the supporting portions disposed in the predetermined area near the wall of the floor. Since there is little displacement of the floor near the wall, even when the floor vibrates locally at a high frequency, a high-frequency vibration can be prevented from being transmitted to the supporting structure.

BRIEF DESCRIPTION OF DRAWINGS

FIG. 1 is an explanatory diagram of a vibration isolation supporting structure and a vibration isolation system according to a first embodiment.

FIG. 2 is a plan view of the vibration isolation supporting structure.

FIG. 3 is a side view showing an operation of a fixing device.

FIG. 4 shows explanatory diagrams of vibration modes of a floor when an impact occurs.

FIG. 5 is an enlarged view showing a modification of the fixing device.

FIG. 6 shows enlarged views of another modification of the fixing device.

FIG. 7 is a plan view showing further another modification of the fixing device and a supporting portion.

FIG. 8 is a side view showing a configuration of a supporting portion of a vibration isolation supporting structure according to a second embodiment.

FIG. 9 is an enlarged view of the supporting portion.

FIG. 10 is an enlarged view showing a modification of the supporting portion.

FIG. 11 is an enlarged view showing another modification of the supporting portion.

FIG. 12 is an enlarged view showing further another modification of the supporting portion.

FIG. 13 is a side view of a vibration isolation supporting structure according to the further another modification.

DESCRIPTION OF EMBODIMENTS

Hereinafter, embodiments of the invention will be described with reference to the drawings. In the embodiment, a vibration isolation supporting structure 2 is described, which can prevent a high-frequency vibration from being transmitted to a vibration isolation target 6 placed on a supporting structure 22 of a floor 5 when a high-speed target collides with a building from outside, and can prevent a relative displacement between the building and the vibration isolation target 6 even when the entire building is deformed and a low-frequency vibration is generated when an earthquake occurs.

The vibration isolation supporting structure 2 of the embodiment is provided with supporting portions 21 on the floor 5 near a wall 4, the supporting structure 22 is disposed on the supporting portions 21, and a translational displacement of the supporting structure 22 is restrained by the supporting portions 21. In addition, in the vibration isolation supporting structure 2 of the embodiment, a leg 23 attached to a lower part of the supporting structure 22 is fixed by a fixing device 24 on the floor 5, and fixing using the fixing device 24 is released when a flying object (not shown) collides with the building.

According to the vibration isolation supporting structure 2 of the embodiment, during a flying object collision, the supporting structure 22 is supported by the supporting portions 21 only near an end of the floor 5, which is a node of vibration of the floor 5. Therefore, a high-frequency vertical vibration of the floor 5 is not easily transmitted to the supporting structure 22, and the high-frequency vibration to be applied to the vibration isolation target 6 disposed on the supporting structure 22 can be reduced.

In addition, according to the vibration isolation supporting structure 2 of the embodiment, the translational displacement of the supporting structure 22 is restrained by the supporting portions 21. Therefore, with respect to the low-frequency vibration during an earthquake that deforms the entire building, the supporting structure 22 and the floor 5 move almost integrally, and the relative displacement between the supporting structure and the floor can be prevented. Further, at normal times (including earthquakes), the supporting structure 22 is fixed to the floor 5 via the leg 23 attached to the lower part of the supporting structure 22, and therefore the relative displacement between the supporting structure 22 and the floor 5 does not occur even when receiving a vertical earthquake motion.

First Embodiment

A first embodiment is described with reference to FIGS. 1 to 7. FIG. 1 shows a configuration example of a vibration isolation system 1 including the vibration isolation supporting structure 2 and a control system 3.

The vibration isolation system 1 includes the vibration isolation supporting structure 2 and the control system 3 that controls the vibration isolation supporting structure 2. The vibration isolation supporting structure 2 is provided, for example, between one wall 4 and the other wall 4 of a nuclear reactor building (not shown). The wall 4 is an outer wall or an inner wall. That is, the vibration isolation supporting structure 2 can be provided between the outer wall and the inner wall of the building, or the vibration isolation supporting structure can be provided between the inner walls facing each other in the building. The control system 3 may be provided for one vibration isolation supporting structure 2, or a plurality of vibration isolation supporting structures 2 may be controlled by one control system 3.

In the vibration isolation supporting structure 2, a plurality of supporting portions 21 are provided facing each other on a predetermined area of the floor 5 near the wall 4 of the building, and the supporting structure 22 is placed on the supporting portions 21.

The predetermined area is a peripheral portion of the floor 5 fixed by the wall 4 and is a position that is the node of vibration when the floor 5 vibrates. That is, in the present embodiment, the supporting portions 21 are respectively disposed at positions that are nodes when the floor 5 vibrates. Therefore, the supporting portions 21 are disposed on the floor 5 so as to face each other and away from each other. A lower end of each supporting portion 21 is fixed to the floor 5. An upper end of each supporting portion 21 is fixed to a lower surface of the supporting structure 22.

A displacement of the supporting structure 22 is restrained by the supporting portions 21. The lower part of the supporting structure 22 is provided with the leg 23. Normally, the leg 23 is fixed to the floor 5 by the fixing device 24 disposed on the floor 5.

The control system 3 controls an operation of the fixing device 24 of the vibration isolation supporting structure 2. The control system 3 includes, for example, an actuator 31, a control device 32, a user interface device (UI device in the FIG. 33, and an alarm generation device 34.

The actuator 31 is a driving device configured to drive the fixing device 24 to release the fixing of the supporting structure 22. When receiving a release command, the control device 32 outputs a control signal to the actuator 31 and the fixing device 24 releases the fixing of the supporting structure 22.

The user interface unit 33 is a device configured to exchange information with the control device 32, and includes, for example, a release instruction unit 331 for giving the release command, and a state display unit 32. When a user such as an administrator predicts an aircraft collision, the user uses the release instruction unit 331 to instruct the control device 32 to output the release command.

The state display unit 332 displays a fixed state of the vibration isolation supporting structure 2. The control device 32 determines the fixed state based on a signal from a sensor 35 provided in the vibration isolation supporting structure 2 and displays a determination result on the state display unit 332. The sensor 35 may be any sensor that can detect an operating state of the fixing device 24. For example, an optical sensor, a proximity switch, or a mechanical limit switch can be used.

The alarm generation device 34 outputs the release command to the control device 32, for example, when an abnormality such as an aircraft collision is detected. The alarm generation device 34 acquires information from, for example, a radar device or a disaster prevention communication network, and outputs the release command.

In the control system 3, for example, the actuator 31 may be disposed near the vibration isolation supporting structure 2, and the control device 32, the user interface device 33, and the alarm generation device 34 may be provided in a control room or the like.

FIG. 2 is a plan view of the vibration isolation supporting structure 2 as viewed from above. The supporting structure 22 includes, for example, two beams disposed in parallel, and the vibration isolation target 6 is fixed on the two beams. The supporting structure 22 may be formed by three or more beams.

A structure example of the fixing device 24 is described with reference to FIG. 3. The fixing device 24 includes, for example, a base 241 partially embedded in the floor 5 and pistons 242 extendably attached to the base 241. The base 241 is formed in a shape sandwiching the leg 23 between both left and right sides, and is embedded in the floor 5. The piston 242 is moved in a left-right direction in FIG. 3 by a hydraulic, pneumatic or electric actuator 31.

As shown in FIG. 3(a), at normal times, the leg 23 is fixed to the floor 5 by extending the piston 242 and sandwiching the leg 23 of the supporting structure 22 between both the left and right sides. With the fixing device 24, a vertical displacement of the leg 23 is restrained.

As shown in FIG. 3(b), when the flying object (not shown) collides with the building, the actuator 31 operates in accordance with the removal command from the control device 32, and the piston 242 is retracted. Accordingly, the fixing using the fixing device 24 is released, and the leg 23 is opened.

The state of vibration is described with reference to FIG. 4. When the flying object collides with the nuclear reactor building, as shown in a first vibration mode of FIG. 4(a) and a second vibration mode of FIG. 4(b), a vibration mode in which the floor 5 locally vibrates at the high frequency is excited.

In these vibration modes, near the wall 4 (a position F in the figure) is the node of vibration, and therefore a vibration amplitude at these positions F is small. During the flying object collision, the fixing using the fixing device 24 is released, and the supporting structure 22 is supported by the supporting portions 21 only at the positions F with the small amplitude. Accordingly, even when the floor 5 vibrates locally at the high frequency in a vertical direction, the vibration of the floor 5 is not easily transmitted to the supporting structure 22. Therefore, the high-frequency vibration of the vibration isolation target 6 disposed on the supporting structure 22 can be reduced.

The displacement of the supporting structure 22 is restrained by the supporting portions 21, and therefore, with respect to the low-frequency vibration that deforms the entire building, the supporting structure 22 and the floor 5 move almost integrally. Therefore, even when equipment such as a pump is placed as the vibration isolation target 6 on the supporting structure 22, the relative displacement between the vibration isolation target 6 and the floor 5 can be prevented. Therefore, a large stress resulting from the relative displacement can be prevented from being generated with respect to a pipe or the like (not shown) connected to the pump or the like.

At normal times (including earthquakes), the supporting structure 22 is fixed to the floor 5 via the leg 23, and therefore the relative displacement between the supporting structure 22 and the floor 5 does not occur even when receiving a vertical earthquake motion. Therefore, according to the present embodiment, the high-frequency vibration of the floor 5 generated during the flying object collision can be prevented from being transmitted to the vibration isolation target 6 placed on the floor, and the relative displacement between the building and the vibration isolation target 6 placed on the floor can be prevented with respect to the low-frequency vibration that deforms the entire building.

FIG. 5 shows a modification of the fixing device 24. In FIG. 3, the leg 23 is sandwiched between the pistons 242. Alternatively, as shown in FIG. 5, recess portions 231 are provided in the leg 23, and the pistons 242 are inserted into the recess portions 231.

In the structure of FIG. 3, since the vertical displacement of the leg 23 is restrained by firmly pressing a tip of the piston 242 against the leg 23, the actuator 31 capable of generating a large load is required. In contrast, according to the modification in FIG. 5, since the vertical displacement of the leg 23 is restrained by bringing the piston 242 into contact with the recess portion 231 in the vertical direction, the load generated by the actuator 31 can be smaller than that in FIG. 3.

FIG. 6 shows a structure example of a fixing device 24a according to another modification. In the modification, a coaxial through hole ha is provided in a portion of the base 241 of the fixing device 24 that sandwiches the leg 23 and the leg 23, and a connecting rod 243 is inserted into the through hole ha. By inserting the connecting rod 243 into the through hole ha, the vertical displacement of the leg 23 is restrained. The connecting rod 243 is driven by a direct acting solenoid 244. The direct acting solenoid 244 is an example of the actuator 31.

As shown in FIG. 6(a), when the direct acting solenoid 244 extends and the connecting rod 243 is inserted into the entire length of the through hole ha, the fixing device 24a fixes the supporting structure 22 to the floor 5 via the leg 23.

In contrast, as shown in FIG. 6(b), when the direct acting solenoid 244 is retracted in preparation for the flying object collision, and the connecting rod 243 is pulled out from a hole formed in the leg 23 (a part of the through hole ha), the fixing device 24a releases the fixing of the supporting structure 22.

In the modification shown in FIG. 6, the connecting rod 243 moves in a horizontal direction, so that with the fixing device 24a, the supporting structure 22 can be fixed or the fixing can be released. Therefore, according to the modification of FIG. 6, the fixing device 24 can be configured with a structure simpler than the structures shown in FIGS. 3 and 5.

When the vibration isolation targets are scattered in a plurality of locations in a room surrounded by the wall 4, the supporting structure 22 may be configured with a flat plate instead of the beam. An arrangement example of the supporting portion 21 and the fixing device 24 in this case is shown in FIG. 7.

In a vibration isolation supporting structure 2a shown in a modification in FIG. 7, four supporting portions 21 are disposed along wall 4 around the room so as to surround four sides of the room, and a flat plate-like supporting structure (not shown) is placed on these supporting portions 21. A plurality of legs (not shown) are provided at a lower part of the flat plate-like supporting structure, and respective legs are fixed by respective fixing devices 24 disposed immediately below these legs.

As described in detail above, according to the present embodiment, when a high-speed target such as an airplane collides with the building from the outside, the high-frequency vibration can be prevented from being transmitted to the vibration isolation target 6 placed on the floor 5, and even when the entire building is deformed and the low-frequency vibration generates when the earthquake occurs, the relative displacement between the building and the vibration isolation target 6 can be prevented.

That is, according to the present embodiment, a single vibration isolation supporting structure 2 can prevent both the high-frequency vibration and the low-frequency vibration, and reliability for the vibration can be improved with a relatively simple configuration and low cost.

Although FIG. 1 shows an example in which only one fixing device 24 is disposed at a center of the supporting structure 22, a disposed location and number of the fixing device 24 can be set as appropriate. For example, when the supporting structure 22 is long, a natural frequency of the supporting structure 22 is low even in a state where the leg 23 is fixed, and therefore there is a risk of resonance during the earthquake. Therefore, when there is a possibility that the supporting structure 22 resonates during the earthquake, a plurality of fixing devices 24 are disposed in a length direction of the supporting structure 22. Accordingly, the natural frequency of the supporting structure 22 can be increased and the resonance during the earthquake can be avoided.

Even when only one fixing device 24 is disposed, the position thereof does not have to be the center of the supporting structure 22. For example, when the vibration isolation target 6 is placed at a position away from the center (gravity center position) of the supporting structure 22, the fixing device 24 may be disposed immediately below the vibration isolation target 6. Accordingly, the supporting structure 22 immediately below the vibration isolation target 6 becomes the node of vibration and the amplitude becomes small, and therefore the vertical vibration of the vibration isolation target 6 during the earthquake can be effectively prevented.

Second Embodiment

A second embodiment is described with reference to FIGS. 8 to 13. Since the present embodiment is equivalent to a modification of the first embodiment, differences from the first embodiment will be mainly described. In a vibration isolation supporting structure 2b of the present embodiment, a supporting portion 21b that does not restrain a rotational displacement of an end of the supporting structure 22 is used. FIG. 8 is a side view of the vibration isolation supporting structure 2b, and FIG. 9 is an enlarged view of the supporting portion 21b.

The supporting portion 21b includes a stud 211 having a spherical or columnar tip, and a socket 212 configured to restrain a translational displacement of the tip of the stud 211. In this structure, since the tip of the stud 211 can rotate like a ball join in the socket 212, the supporting portion 21 does not restrain the rotational displacement of the end of the supporting structure 22.

Therefore, according to the vibration isolation supporting structure 2b of the present embodiment, the floor 5 is deformed as shown in FIG. 4. Even when a slight rotational displacement occurs in the floor 5 at the end of the floor 5 (the position F in the figure), vibration transmission from the floor 5 to the supporting structure 22 can be reduced as compared with the first embodiment since the rotational displacement is not transmitted to the end of the supporting structure 22.

A supporting portion as shown in FIGS. 10 and 11 may be used. A supporting portion 21c shown in FIG. 10 includes the stud 211 having a hemispherical or semicircular tip, and the socket 212 configured to restrain a horizontal displacement of the tip of the stud 211.

A supporting portion 21d shown in FIG. 11 includes a set of sockets 215 each attached to the supporting structure 22 and the floor 5, and a rolling element 214 (a sphere, a cylinder, or a circular tube) sandwiched between the set of sockets 215. As in the structure shown in FIG. 9, the structure shown in FIG. 11 does not restrain the rotational displacement of the end of the supporting structure 22, and can reduce the vibration transmission from the floor 5 to the supporting structure 22 as compared with the first embodiment.

Further, in the structure shown in FIG. 10, assembly is completed simply by placing the supporting structure 22 provided with the stud 211 on the socket 212 on the floor 5. Similarly, in the structure shown in FIG. 11, assembly is completed simply by placing the supporting structure 22, to which an upper socket 215 is attached, on a lower socket 215 with the rolling element 214 sandwiched from above and below. Therefore, the structures shown in FIGS. 10 and 11 are easier to construct than the structure in FIG. 9.

However, in the structures shown in FIGS. 10 and 11, since a vertical displacement of the supporting structure 22 is not restricted, there is a possibility that the supporting structure 22 is lifted from the floor 5 during the earthquake when the mass of the vibration isolation target 6 is light. Therefore, a wire 213 for connecting the supporting structure 22 and the floor 5 may be attached near the socket 212, and the vertical displacement of the supporting structure 22 may be restrained by the wire 213, so that lifting is prevented.

FIGS. 12 and 13 show further another modification. FIG. 12 is an enlarged perspective view showing a supporting portion 21e. FIG. 13 is a side view of the vibration isolation supporting structure 2.

The supporting portion 21e includes a plurality of supporting blocks 216 spaced apart and fixed on the floor 5, supporting structures 22 attached between the supporting blocks 216 so as to be relatively rotatable, and a shaft 217 passing through the supporting blocks 216 and the supporting structures 22.

As shown in FIG. 13, both ends of each supporting structure 22 are supported respectively by the plurality of supporting blocks 216 so as to be relatively rotatable.

As in the structure shown in FIG. 9, the structure shown in FIGS. 12 and 13 does not restrain the rotational displacement of the end of the supporting structure 22 while restricting the translational displacement of the supporting structure 22. The structure shown in FIGS. 12 and 13 includes simple shaped square members and shafts, so that parts can be easily processed and manufacturing cost of the vibration isolation supporting structure can be reduced.

The invention is not limited to the above embodiments, and includes various modifications. For example, the above embodiments have been described in detail for easy understanding of the invention, and the invention is not necessarily limited to those including all the configurations described. A part of the configuration of one embodiment can be replaced with the configuration of another embodiment, and the configuration of another embodiment can be added to the configuration of one embodiment. A part of the configuration of each embodiment may be added, deleted, or replaced with another configuration.

REFERENCE SIGN LIST

1: vibration isolation system
2: vibration isolation supporting structure
3: control system
4: wall
5: floor
6: vibration isolation target
21: supporting portion
22: supporting structure
23: leg
24: fixing device
32: control device
F: node of vibration

The invention claimed is:

1. A vibration isolation supporting structure that prevents a vibration, comprising:
   a plurality of supporting portions erected facing each other near a wall of a floor of a building;
   a supporting structure supported above the floor by the supporting portions;
   a leg extending toward the floor from the supporting structure;
   a fixing device partially embedded in the floor and including two pistons sandwiching the leg of the supporting structure thereby fixing the supporting structure to the floor; and
   an actuator connected to the two pistons that, upon receiving a release command, retracts the two pistons.

2. The vibration isolation supporting structure according to claim 1, wherein
   a plurality of the fixing devices are disposed to be spaced apart from each other in a longitudinal direction of the supporting structure.

3. The vibration isolation supporting structure according to claim 1, wherein
   the supporting portions support the supporting structure to be relatively rotatable.

4. The vibration isolation supporting structure according to claim 1, wherein
   the supporting structure includes at least one beam member.

5. The vibration isolation supporting structure according to claim 1, wherein
   the supporting structure includes a flat plate member.

6. A vibration isolation system that prevents a vibration using an vibration isolation supporting structure,
   the vibration isolation supporting structure including:
      a plurality of supporting portions erected facing each other near a wall of a floor of a building;
      a supporting structure supported by the supporting portions;
      a leg extending toward the floor from the supporting structure; and
      a fixing device partially embedded in the floor and including two pistons sandwiching the leg of the supporting structure thereby fixing the supporting structure to the floor;
   an actuator connected to the two pistons; and
   a controller connected to the actuator;
   wherein the controller is configured to, upon receiving a predetermined input, output a release command to the actuator, and
   wherein the actuator, upon receiving the release command, retracts the pistons.

* * * * *